United States Patent [19]
Colligan et al.

[11] Patent Number: 5,361,626
[45] Date of Patent: Nov. 8, 1994

[54] METHOD AND APPARATUS FOR DETECTING LEAKS IN SEALED PACKAGES

[75] Inventors: Francis D. Colligan, Waterbury; Lloyd S. Brown, Guilford, both of Conn.

[73] Assignee: United States Surgical Corporation, Norwalk, Conn.

[21] Appl. No.: 827,340

[22] Filed: Jan. 29, 1992

[51] Int. Cl.⁵ .............................. G01M 3/20
[52] U.S. Cl. .................................... 73/40.7
[58] Field of Search ............... 73/40.7, 49.3, 45.4, 73/52

[56] References Cited

U.S. PATENT DOCUMENTS

| | | | |
|---|---|---|---|
| 3,592,049 | 7/1971 | Johanski, Jr. | 73/45.2 |
| 3,888,111 | 6/1975 | Craig | 73/49.3 X |
| 4,920,785 | 5/1990 | Etess | 73/49.3 X |
| 5,082,366 | 1/1992 | Tyson, II et al. | 356/35.5 |
| 5,128,269 | 7/1992 | Otiate et al. | 73/40.7 X |

FOREIGN PATENT DOCUMENTS 8303080  4/1985  Netherlands ............ 73/49.3

OTHER PUBLICATIONS

Demorest, Non-Destructive Leak Detection of Blister Packs and Other Sterile Medical Packages, Journal of Packaging Technology, vol. 2, No. 5, Oct. 1988.
Mocon Promotional Literature.
Baseline Industries, Inc., MSA Promotional Literature.
Photovac AutoTIP TM Promotional Literature.

*Primary Examiner*—Hezron E. Williams
*Assistant Examiner*—Joseph W. Roskos

[57] ABSTRACT

A hydrocarbon leak detector apparatus detects defectively sealed packages by monitoring for the presence of a volatile hydrocarbonaceous substance that leaks from defective packages. The apparatus includes one or more sealable chambers, a vacuum generator pump, a hydrocarbon detector and conduit means for delivering air from the chamber(s) to the hydrocarbon detector.

33 Claims, 6 Drawing Sheets

METHOD AND APPARATUS FOR DETECTING LEAKS IN SEALED PACKAGES

BACKGROUND OF THE INVENTION

1. Field of the Invention

The present invention relates to a method and apparatus for assessing the integrity of sealed packages and, more particularly, to detection of volatile substances which may leak from sealed packages.

2. Description of Related Art

A variety of materials or products are packaged to protect the materials or products from contact with an uncontrolled environment. Such packages are designed to be leak-free because contact of the contents of the package with the outside environment would result in degradation and/or alteration of the contents, e.g., by evaporation or chemical reaction. Production of leak-free packages is important to the pharmaceutical and sterile medical products industries as well as to the food and chemical industries.

Numerous techniques have been developed to seal packages and form air-tight or hermetic seals. For example, a plastic laminate may be heat sealed together along the edges of the package or an adhesive may be applied to the interior edges of a pouch and the two halves are pressed against each other. Many methods for sealing packages involving various materials are known to those with skill in the art.

Unfortunately, mass production of air-tight packages usually results in a certain percentage of leaking packages. In order to prevent distribution of such defective packages, it is necessary to have techniques for detecting defective leaking packages. One method for detecting leaks involves filling a vessel with water, sealing the vessel, creating a partial vacuum within the vessel and placing a package under the water. If the package is defective, gas contained in the package will leak out and bubbles of escaping gas will appear. While the so-called water bath method is sensitive, it is destructive to the package, messy, and capillary action can give false results.

Another method for detecting leaks involves testing for flow of a trace gas leaking from a package as is described in an article by Demorest, R. entitled Non-Destructive Leak Detection of Blister Packs and Other Sterile Medical Packages, Journal of Packaging Technology, Vol. 2, No. 5 (1988). As a trace gas, either carbon dioxide or helium may be introduced into the package headspace in one of three ways: (1) flushing the package and its contents with the gas prior to sealing; (2) forcing the gas into the package after sealing with a pressurized bomb; and (3) providing the gas as a normal component of the product or package.

After the gas has been introduced into the package a pressure differential is induced across the package wall thus causing the gas to leak from the package. After the gas has been allowed to leak from the package, room air is allowed to sweep the gas to a detection sensor, such as an infrared detector in the case of carbon dioxide or a mass spectrometer in the case of helium. Detection of carbon dioxide by the infrared detector requires a $CO_2$ concentration of 100 parts per million (ppm) or more at the detector and leaks providing less than the required concentration may go undetected. The mass spectrometer used to detect helium leaks has several shortcomings including susceptibility to overloading and the requirement of a hard vacuum, i.e., if there is any contamination, such as by water, a hard vacuum cannot be drawn until all of the water has evaporated. Furthermore, it may not be practical for certain production techniques to incorporate a step involving exposure to a gas.

While the above described techniques may be useful for certain applications, there is a need for leak detection techniques of improved sensitivity and which avoid the shortcomings of existing protocols. The present invention relates to such an improved method and apparatus.

OBJECTS AND SUMMARY OF THE INVENTION

It is an object of the present invention to detect leaks from sealed packages.

It is a further object of the invention to provide a highly versatile hydrocarbon leak detecting apparatus.

It is a still further object of the invention to detect hydrocarbonaceous compounds leaking from sealed packages.

It is yet a further object of the invention to provide an apparatus having a high degree of sensitivity in detecting materials leaking from packages.

These and other objects of the present invention will become apparent from the following description.

In accordance with the present invention, a method for evaluating the integrity of a sealed package involves depositing a volatile hydrocarbonaceous substance within a package which is then sealed. The package is placed into a chamber and the chamber is monitored for the presence of the volatile hydrocarbonaceous substance. A vacuum may be drawn inside the chamber to facilitate leakage of the substance through any leaks which may be present in the package. If the hydrocarbonaceous substance is detected in the chamber, the package leaks and is defective.

The apparatus according to the present invention includes one or more sealable chambers, a vacuum generator pump, a hydrocarbon detector and conduit means for delivering air from the chamber to the hydrocarbon detector.

DETAILED DESCRIPTION OF THE INVENTION

Figure 1:
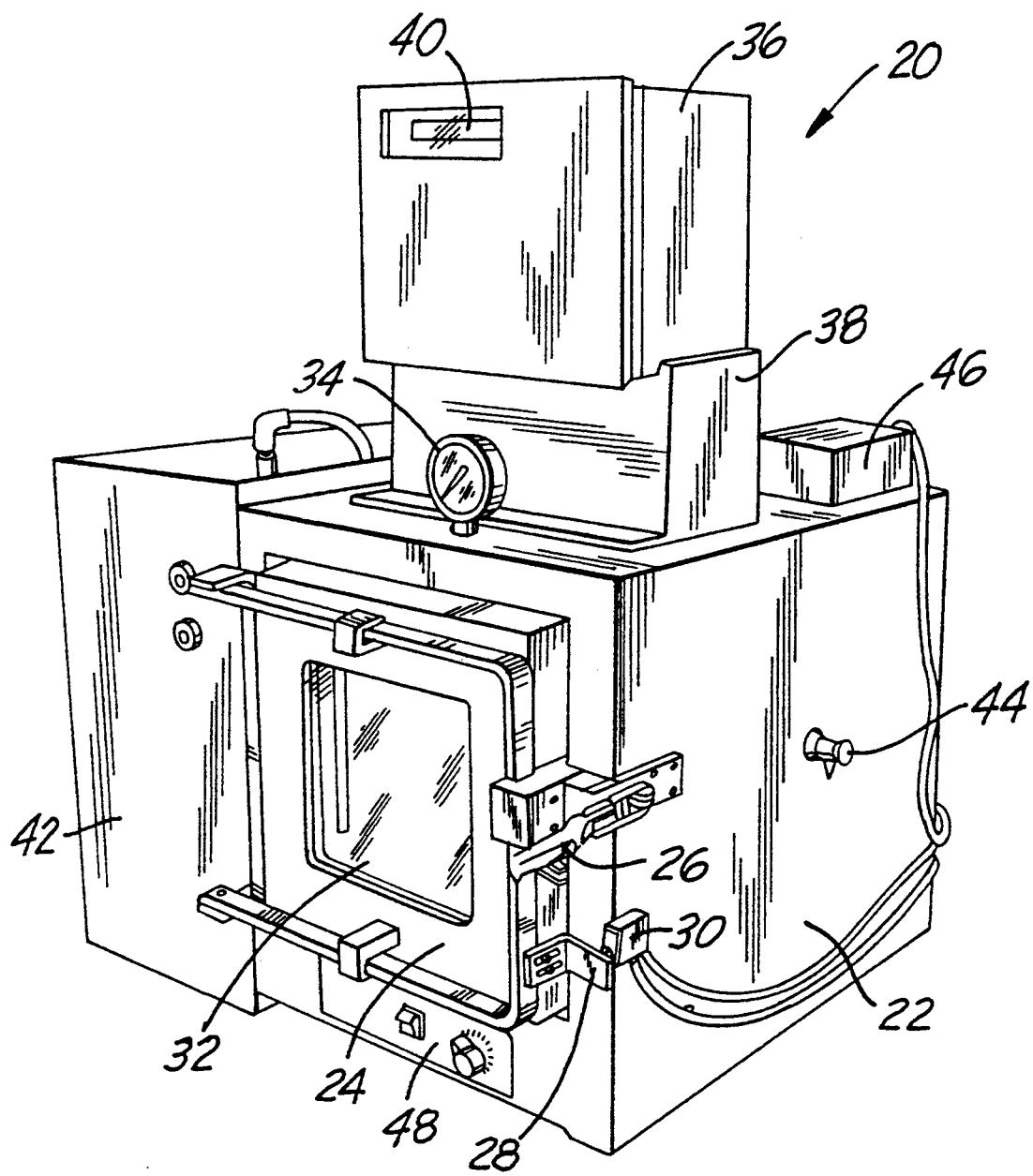
FIG. 1 is a perspective view of a hydrocarbon leak detector according to the present invention.
Figure 2:
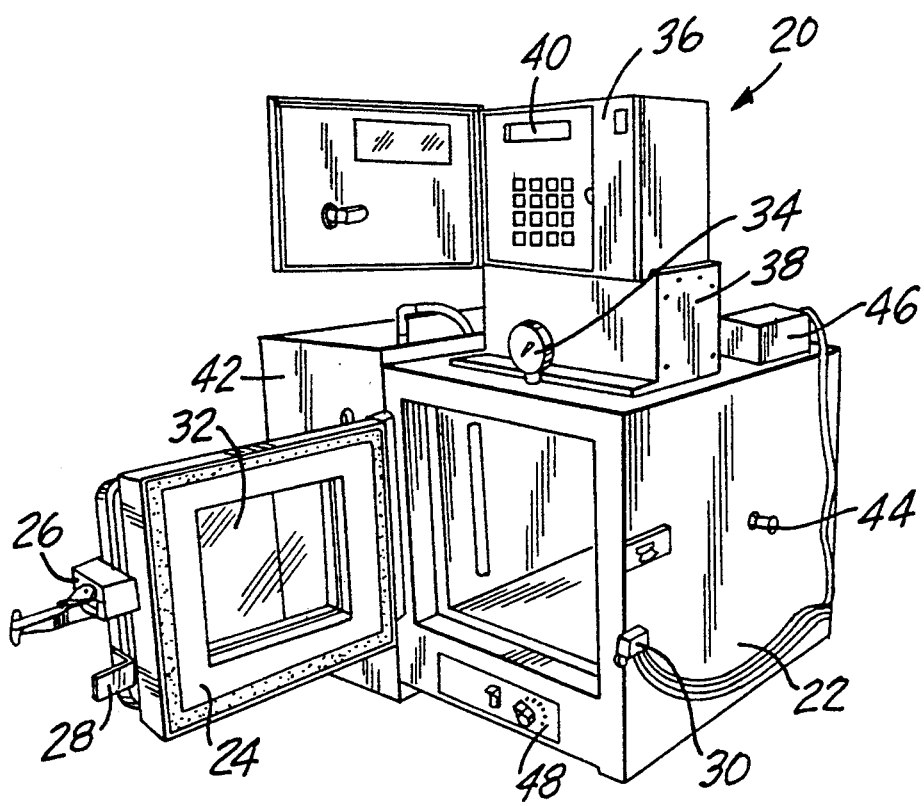
FIG. 2 is a perspective view of the hydrocarbon leak detector shown in FIG. 1 further illustrating additional features.
Figure 3:
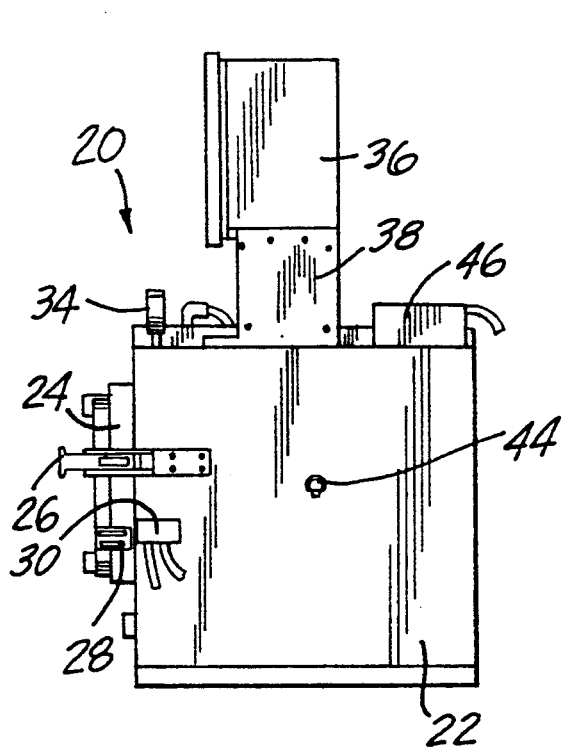
FIG. 3 is a side view of the hydrocarbon leak detector shown in FIG. 1.

A hydrocarbon leak detector apparatus according to the present invention permits detection of leaks in sealed packages containing one or more detectable volatile hydrocarbons. The leaking volatile hydrocarbon is detectable by a photoionizer, or more preferably, a gas chromatograph.

A hydrocarbon leak detector apparatus 20 which incorporates a photoionizer is illustrated, for example, in FIGS. 1 through 7 and includes a chamber 22 having a door 24 which can be hermetically sealed during operation of the apparatus. When sealed, the chamber 22 is capable of maintaining a vacuum which facilitates leakage of faulty packages by creating a pressure differential along the surface of packages being evaluated. The door 24 is closed by a handle and lock mechanism 26 which causes a striker 28 to contact a door interlock switch 30 and thus automatically start operation of the leak detector 20. An operator of the device can look into the chamber 22 through a viewing screen 32 located in the door 24 and monitor the vacuum within the chamber by watching a vacuum gauge 34.

A photoionizer 36 is attached to the chamber 22 through a photoionizer mount 38. The photoionizer 36 is a microprocessor-controlled instrument for measuring the presence of ionizable chemicals in the air at parts per million (ppm) levels. The photoionizer 36 converts the concentration of ionizable chemicals in a sample into an electronic signal and multiplies the signal by a response factor previously obtained by injecting a standard gas of known concentration to calculate a sample concentration in ppm. The response factor is determined using span gas, e.g., a standard isobutylene sample of known concentration. Thus the photoionizer 36 displays concentration in ppm isobutylene equivalent, i.e., units equivalent to ppm of isobutylene. The concentration appears on a display 40 located on the photoionizer 36 and if the concentration exceeds a predetermined level, an alarm is activated. It should be noted that any gaseous or volatile hydrocarbonaceous compound can be used as or in the span gas as long as the concentration of the compound in the span gas is known.

The photoionizer 36 is capable of detecting thousands of different airborne gases and vapors, especially hydrocarbons, and its response depends upon the type of chemical as well as the concentration. Although the photoionizer 36 does not distinguish between each chemical, it indicates the total concentration of all ionizable chemicals in the sample.

The photoionizer 36 incorporates an ultraviolet (UV) lamp that generates photons which ionize specific molecules in a stream of gas. The permanent air gases in zero gas (nitrogen, oxygen, water vapor, argon, carbon dioxide, etc.) require a relatively high energy for ionization, and are not ionized by the UV radiation. Other chemicals, such as hydrocarbons, are ionized. The ionized molecules are subjected to a continuous electric field between a repeller electrode and a collector electrode. Because ions possess an electrical charge, they tend to move within the field and generate current. The magnitude of the current is proportional to the concentration of ions which is then translated into a voltage that the microprocessor can use.

Figure 5:
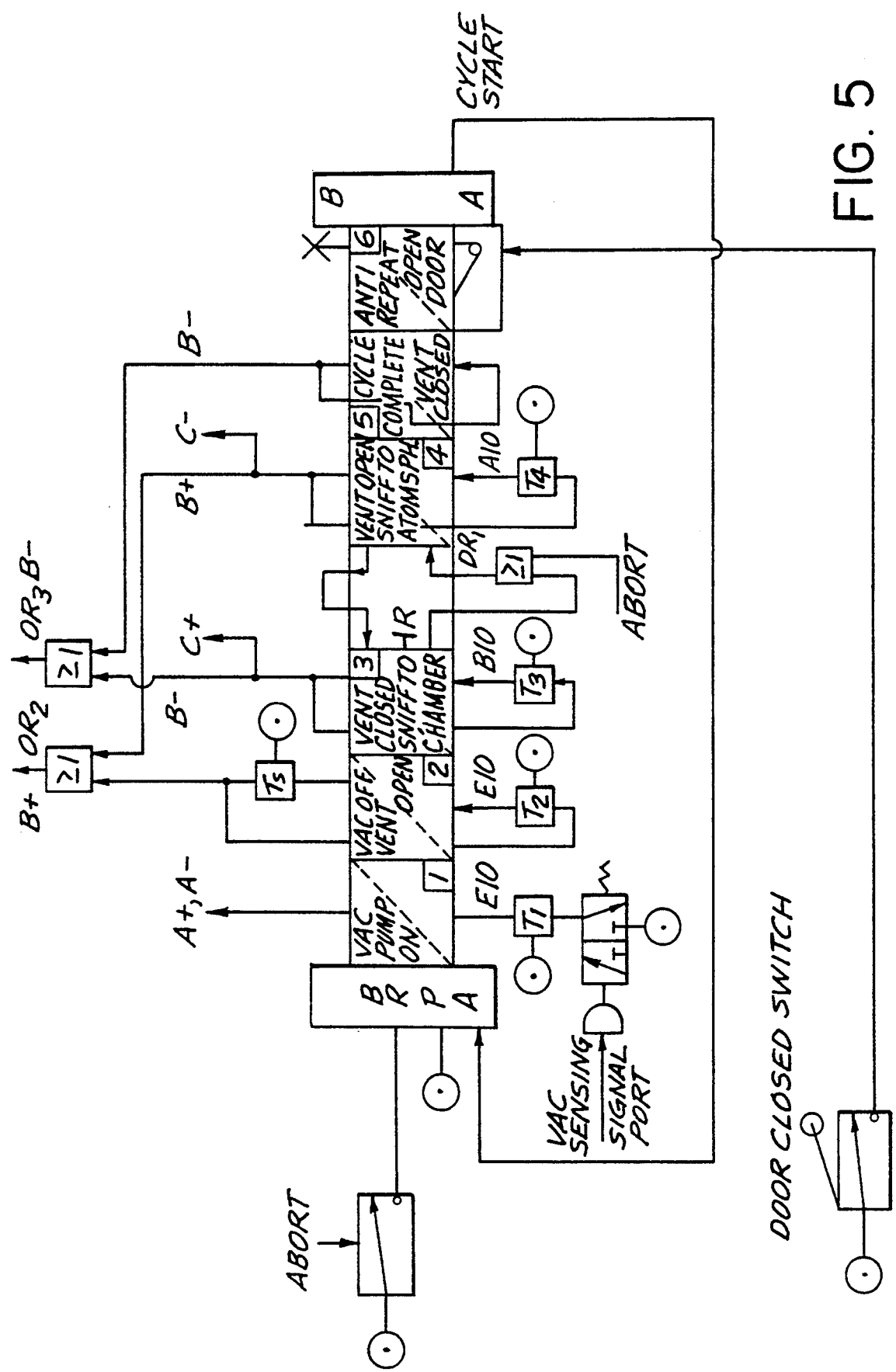
FIG. 5 is a schematic illustration of the operation of a hydrocarbon leak detector according to the present invention.
Figure 6:
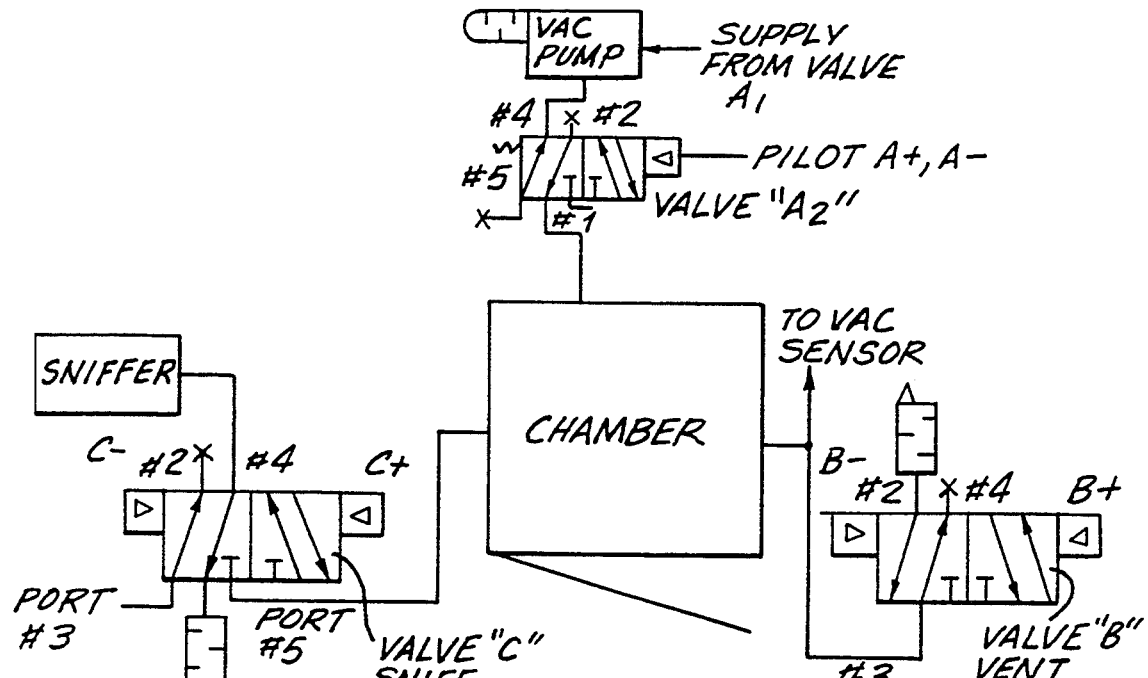
FIG. 6 is a schematic illustration of the operation of valves described in FIG. 5.
Figure 7:
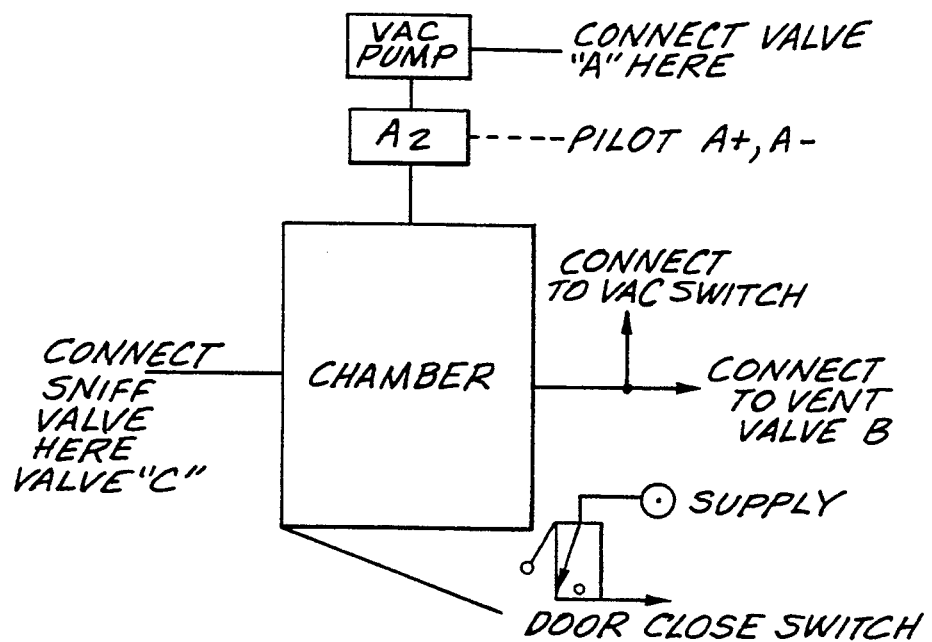
FIG. 7 is a schematic illustration of chamber and valves according to the present invention.

A pneumatic system is illustrated in FIGS. 5 through 7 and, according to the present invention, regulates the operation of the hydrocarbon leak detector apparatus 20. Sequential steps in the procedure are controlled by a metallic poppeted memory with built in magnets to insure step control in the event of the loss of system pressure. Each step is interlocked such that the active step command will not allow the sequence to continue until the proper feed-back input is received.

Figure 4:
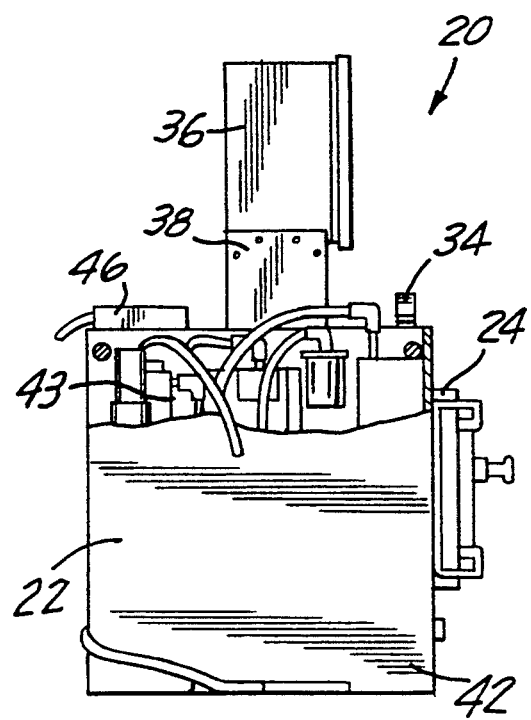
FIG. 4 is a partial cut-away view of an opposite side of the hydrocarbon leak detector shown in FIG. 1.

In operation, the procedure for detecting leaks in accordance with the present invention is as follows: A quantity of sealed bags are loaded into the chamber 22 and the chamber door 24 is closed. The door interlock switch 30 is then activated. As can be seen from FIG. 5, step one goes active and the vacuum pump (which is contained in the vacuum pump housing 42) is activated. An assembly 43 of pipes and valves is depicted in FIG. 4, which assembly 43 connects various air inputs and the like that are used in carrying out the pneumatic system described herein.

The vacuum pump is connected to the chamber 22 through valve A, which includes two valves $A_1$ and $A_2$ (see FIG. 6). $A_1$ controls air input to the vacuum pump and opens and closes simultaneously with $A_2$ which isolates the chamber 22 from the vacuum pump. Thus, when $A_1$ and $A_2$ are open (A+), a vacuum is pulled within the chamber 22. Conversely, when $A_1$ and $A_2$ are closed (A−), the pump does not pull further vacuum within the chamber 22. Valve A can be spring controlled to automatically shut the vacuum pump off when air input is terminated.

A vacuum sensing signal port, i.e., an air pressure switch, senses the vacuum in the chamber 22 and is the feedback to step one. Once a predetermined vacuum is reached, a pneumatic timer (Timer 1, abbreviated $T_1$) is activated for the time period E10. E10 may range from about 0.1 seconds to about 3.0 seconds from signal to output. After E10, the vacuum pump turns off (A−) and step two becomes active (step one is inactive).

Step two maintains the vacuum pulled in the chamber 22 (about a 10 inch vacuum) for about 30 seconds and then for the period E10 controlled by Timer 5 ($T_5$). After $T_5$ is activated, the chamber vent purge valve (valve B) (See FIG. 6) is open (B+) and atmospheric air is introduced back into the chamber 22 to bring the chamber 22 to ambient pressure. After about 0.1 to about 3.0 seconds (E10), controlled by $T_2$, the purge valve is closed (B−) and step three becomes active and step two is inactive.

Step three allows the photoionizer 36 to be exposed to the contents of the chamber 22 and also activates Timer 3 ($T_3$) which has a timing range of about 3 to about 180 seconds (B10). $T_3$ determines the amount of time the photoionizer 36 is exposed to the chamber 22 and, at completion, allows step four to go active and step three inactive. During step three, valve C is open (C+) (See FIG. 6) and a vacuum pump within the photoionizer 36 (which is always running) pulls air from within the chamber 22 into the photoionizer 36 where it is analyzed as described above.

Step four allows the chamber 22 to be exposed to the outside atmosphere via valve B (B+). Valve C closes (C−), thus isolating the photoionizer 36 from the chamber 22 and allowing atmospheric air to be pulled into the photoionizer 36. A silencer or filter is provided to prevent certain contaminants from going into the photoionizer 36 while it is exposed to atmospheric air. Step four activates Timer 4 ($T_4$) which after the time period A10 (about 1.0 to about 30.0 seconds) activates step five and step four becomes inactive.

Step five closes the chamber purge valve (B−) which seals the chamber 22 from atmosphere, the vacuum pump (A−) and the photoionizer 36 (C−). At this point the cycle is complete.

Step six is an anticycle repeat which prevents steps one through four from automatically repeating. The chamber door 24 is still closed and the overall sequence is at cycle complete. To continue the cycle, the chamber door 24 must be opened, thus allowing step five to activate step six and closed to repeat the sequential cycle.

An abort cycle is provided to stop operation of the leak detector apparatus 20. Cycle abort institutes the following events: (1) vacuum pump turns off (A−); (2) the chamber 22 is vented to atmosphere (B+); (3) the chamber 22 is isolated (B−, C−); and (4) the photoionizer 36 is exposed to outside atmosphere.

The chamber 22 may contain a bleeder valve 44 for manually overriding any vacuum contained within the chamber 22. A temperature control 48 can be provided to vary the temperature of the chamber 22 when process parameters allow. Also shown in FIGS. 1 through 4 is a power supply 46 to the leak detector 20.

Utilization of the above-described hydrocarbon leak detector apparatus 20 allows detection of any ionizable chemical which may leak or be caused to leak from a sealed package. The leak detector apparatus 20 is sensitive to about 0.1 ppm of the chemical being tested for. Thus, one or more volatile elements may be placed within a package during the production process, the only requirement being that the volatile element does not adversely interact with the product contained within the package. Use of the photoionizer 36 allows non-specific testing and is thus highly versatile. No adjustments need to be made which relate to the nature of the volatile element, i.e., the apparatus 20 does not have to be adjusted to specifically detect a desired compound.

Figure 8:
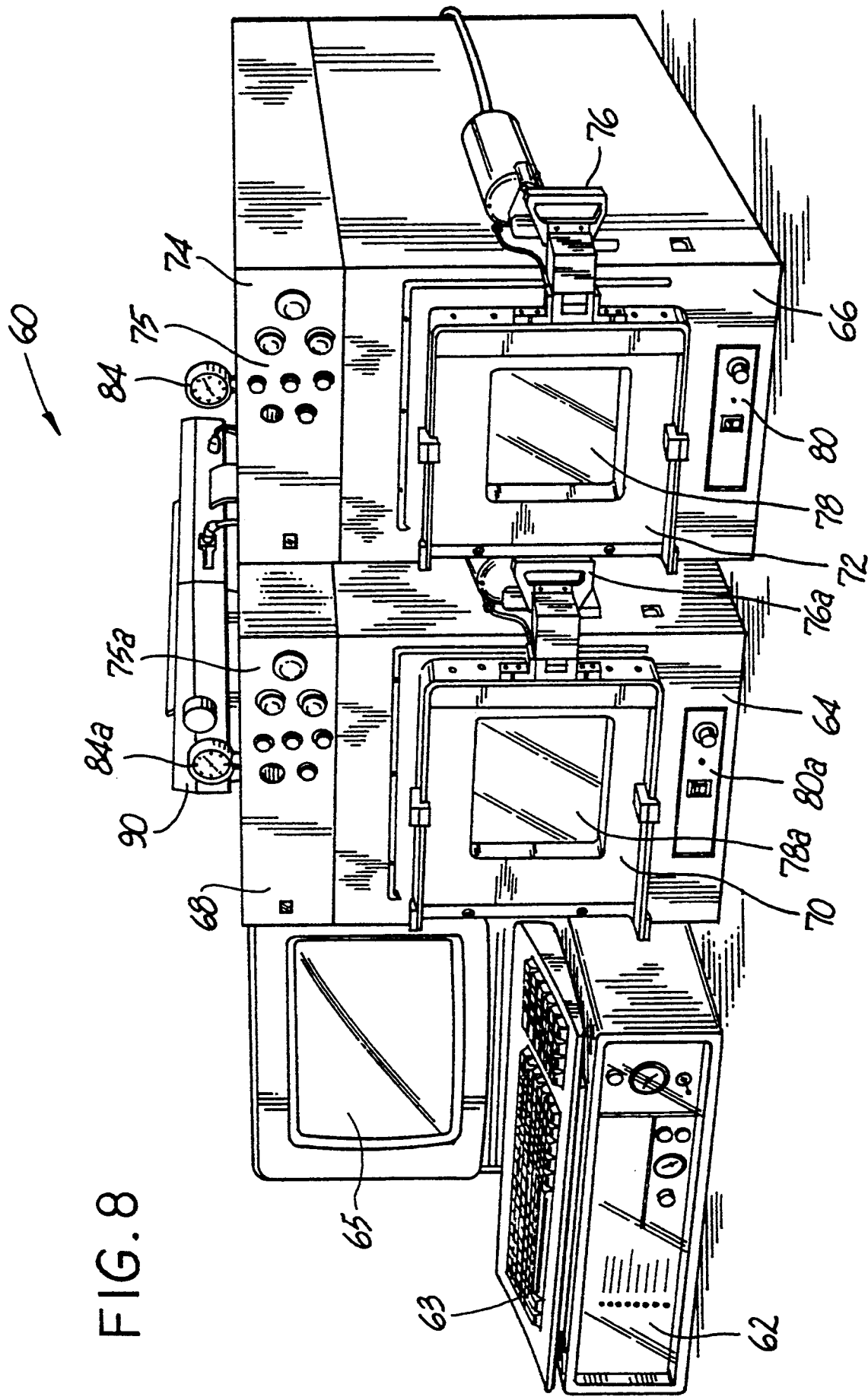
FIG. 8 is a perspective view of another embodiment of a hydrocarbon leak detector according to the present invention.

A preferred embodiment of a leak detector apparatus according to the present invention is illustrated at 60 in FIG. 8 and incorporates a gas chromatograph (GC) 62 that can be used to detect specific hydrocarbons in concentrations as low as one part per billion (ppb) depending on the nature of the hydrocarbon being tested. For example, isopropyl alcohol can be detected at a concentration of 20 ppb. The superior sensitivity of a GC leak detector apparatus 60 allows detection of minuscule leaks in packages, thus facilitating better quality control in production practice. The preferred GC leak detector 60 also provides the capacity to include multiple test chambers for use in association with one gas chromatograph.

The leak detector apparatus 60 includes the gas chromatograph 62, a master microprocessor controlled automated vacuum chamber 64 and one or more slave vacuum chambers 66 which are not capable of operation without the master 64.

The gas chromatograph 62 used in accordance with the present invention may be adapted to detect specific chemicals, such as isopropyl alcohol, by adjustment of a standard permeation device which is associated with the gas chromatograph 62. The permeation device is designed to continuously release a fixed rate of material, such as a hydrocarbon, at a given temperature. During calibration, the material is continuously mixed with a carrier gas, such as nitrogen, at a known flow rate which results in a calibration mixture of known concentration. The material can be varied to correspond to the target volatile hydrocarbon being detected and thus acts as a reference standard by which the concentration of hydrocarbon leaking from a sealed package and contained in the master chamber 64 is determined. For example, if the packages being tested contain isopropyl alcohol, the permeation device incorporates isopropyl alcohol as the material which is used as a reference standard.

The gas chromatograph 62 includes a keyboard 63 which is used to program the gas chromatograph 62 and a cathode ray tube 65 which displays certain information generated by the gas chromatograph 62. A printer 90 can be included to print information displayed on the cathode ray tube 65.

Figure 9:
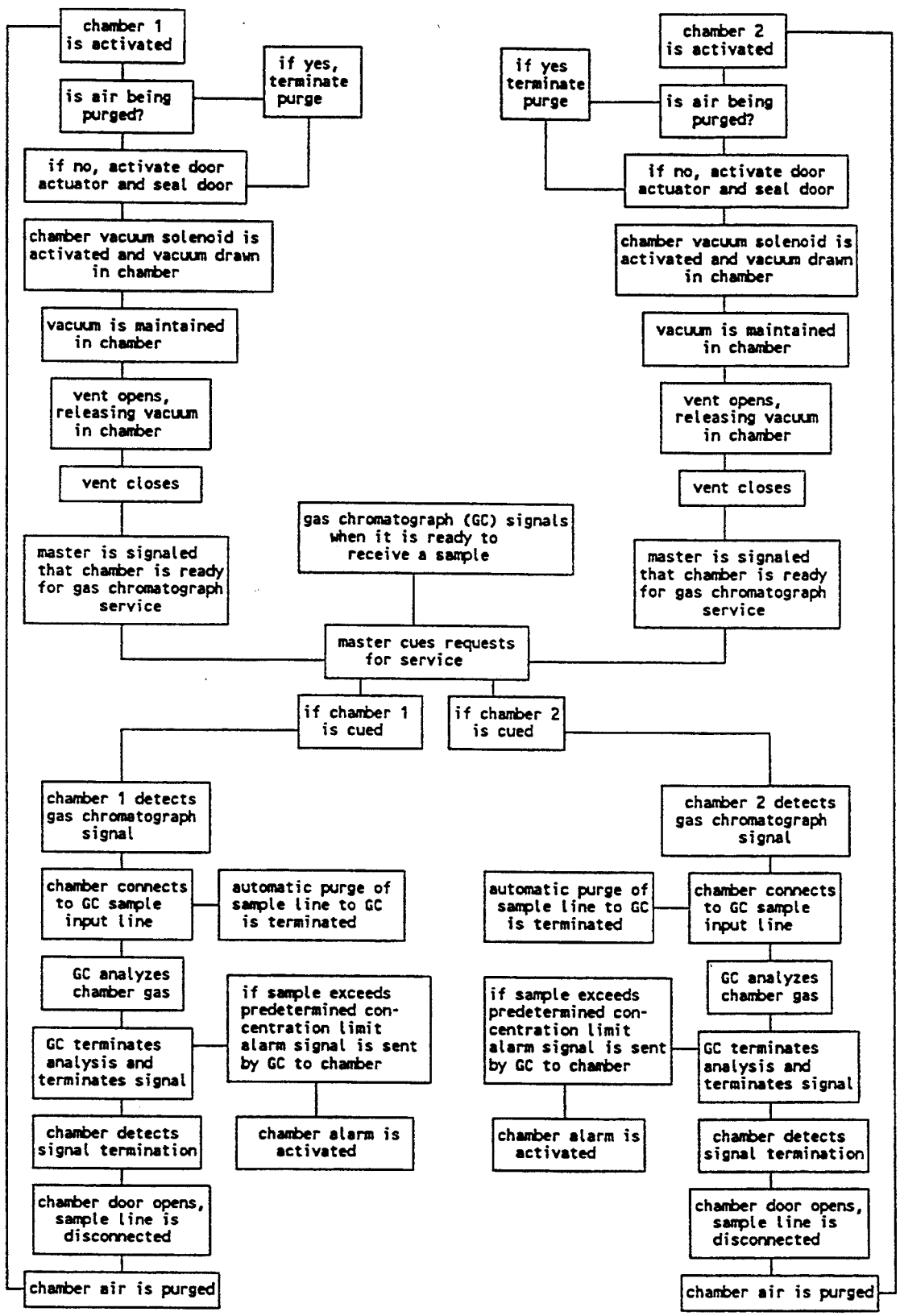
FIG. 9 is a flow diagram depicting the operation of the hydrocarbon leak detector shown in FIG. 8.

The master vacuum chamber 64 is connected to and controlled by a master microprocessor 68 which oversees the sequence of operation between the master vacuum chamber 64, one or more slave chambers 66 and gas chromatograph 62. An example of such a sequence is depicted in FIG. 9. The master chamber 64 is referred to as chamber 1 and the slave chamber 66 is referred to as chamber 2. Each slave chamber 66 has a controller 74 associated with it to perform certain below described operations. The master microprocessor 68 and the slave controller 74 both can include an operations panel 75a or 75 respectively, having, inter alia, certain below described indicator lights and control switches.

In operation, the packages being tested are loaded into either chamber 1 or chamber 2 and door 70 or 72 is closed. For convenience, the operation of the apparatus 60 will be described in relation to the slave chamber 66. A sequence activation switch may be incorporated to automatically start the operation of the apparatus 60 when the door 72 is closed. Alternatively, an operator may close the door 72 and manually start operation of the apparatus 60 by pressing a start button. The operator may view the interior of the chamber 66 by looking through a viewing screen 78. If purging air had been purging the chamber 66, it will be turned off by the controller 74 associated with the slave chamber 66. Purging air is used to clear any possibly contaminated air, which may have been left from the last test, out of the chamber 66.

When the chamber door 72 is closed, it can be locked, e.g., a door solenoid can be energized which allows air pressure to be applied to a door actuator 76, thus locking the chamber door 72. If desired, a first indicator lamp can be illuminated by the controller 74 to indicate that the test sequence has been initiated and that the chamber 66 is either being prepared or is ready for the gas chromatograph 62 to sample. When the door 72 is locked, a vacuum is pulled within the chamber 66 which can range from slightly less than one atmosphere to nearly absolute vacuum, e.g., from about 1 or more inches of mercury, but is preferably about 10 inches of mercury. The vacuum may be monitored by an operator viewing a vacuum gauge 84. When a 10 inch mercury vacuum is reached, the vacuum pump is deactivated by the controller 74 and the vacuum is maintained within the chamber 66 for a sufficient period of time, e.g., about 5 or more seconds, but preferably about 10 to 30 seconds, to cause the volatile substance contained within the packages to leak through any holes that may be present. The controller 74 then opens a vent which permits outside air to be drawn into the chamber 66 until ambient pressure is reached, e.g., about 10 seconds. The controller 74 closes the vent and the chamber 66 is again sealed, retaining atmospheric pressure within the chamber 66. The controller 74 then signals the master control unit 68 that the slave chamber 66 is ready to be serviced by the gas chromatograph 62. It should be noted that, if desired, the temperature inside the chamber 66 can be controlled by a heating element having controls 80 disposed on the front of the chamber 66.

The same sequence of events described above is also applicable to the master chamber 64, which is under the control of the master controller 68 (see FIG. 9). The master controller 68 and master chamber 64 include many of the same features that the slave chamber 66 and slave controller 74 have, e.g., vacuum gauge 84a, door actuator 76a, operations panel 75a, viewing screen 78a, heating controls 80a, etc. If, in addition to one or more slave chambers, the master chamber 64 is also loaded with packages to be tested, the master controller 68 will internally note that it is ready to be serviced by the gas chromatograph 62 when the appropriate point in the cycle is reached. The master controller 68 then cues requests for service and grants them to itself and to the slaves in rotation as they become ready.

The gas chromatograph 62 can be programmed to complete each of its testing cycles in about two minutes although any other convenient time period may be used in accordance with the present invention. The gas chromatograph 62 signals the master controller 68 each time in its two minute cycle when it is ready to begin sampling. The signal can be, e.g., in the form of a 12 volt DC signal which drops to zero 60 seconds later in the cycle. The signal is monitored by both controllers 68 and 74 requesting service. If the master controller 68 grants service to one of the chambers, e.g., 66, the first indicator lamp is turned off by controller 74 and a second indicator light is illuminated, indicating that the chamber 66 is being sampled by the gas chromatograph 62. At that time, the chamber 66 is connected to an input line of the gas chromatograph 62. In one embodiment, whenever any chamber is connected to the chromatograph 62 input line, a solenoid is automatically energized. Whenever the solenoid is not energized, the gas chromatograph input sample line is continuously connected to atmosphere resulting in an automatic purge of the input sample line.

A vacuum pump contained within the gas chromatograph 62 pulls gas from the sealed chamber 66 and analyzes the chamber gas. When the slave controller 74 detects that the 12 volt signal from the gas chromatograph 62 has dropped to zero, the chamber door 72 is opened by release of the door actuator, the sample input line is disconnected from the chamber 66 and low pressure purging air to the chamber 66 is turned on by the controller 74. The second indicator lamp goes out and a third indicator lamp is illuminated which signifies that the test sequence has been completed and that the chamber 66 may be emptied and reloaded for another test.

At the completion of the test, if the level of detectable hydrocarbon exceeds a predefined limit which has been programmed into the gas chromatograph, an alarm signal is sent by the gas chromatograph 62 to the controller 74 of the chamber 66 being serviced and the controller 74 turns on an audible alarm and illuminates a fourth indicator lamp. The predefined limit is based upon the difference between normal room conditions, i.e., the amount of target chemical normally in the environment, and elevated levels of the target chemical that result from evacuation of any leaking packages. The alarm indicates that the detectable hydrocarbon has leaked from one or more packages and that, consequently, at least one package is defective.

In a preferred leak detection procedure, a quantity of sealed packages containing surgical sutures and isopropyl alcohol, e.g. 200, is placed in the slave chamber 66. The alarm is preset to 200 ppb above background (about 300 ppb) which totals 500 ppb. The door 72 is closed and the start button pressed. A vacuum of about 10 inches of mercury is pulled in the slave chamber 66 and held for about 10 seconds. If there is a hole or leak in any package, the vacuum will draw isopropyl alcohol vapors from the package and into the chamber 66. The chamber 66 is then back filled to about 1 atmosphere pressure. When the gas chromatograph 62 is ready, a sample is taken from the chamber 66 and analyzed by the gas chromatograph 62. If isopropyl alcohol is detected in a concentration above 500 ppb, the alarm is activated. When the alarm sounds, the operator of the apparatus 60 removes the packages from the chamber 66, subdivides the quantity, e.g., into half (100), and waits a sufficient period of time for the chamber 66 to be purged by the purging gas, e.g., one minute. The system may be tested at that point to confirm reliability by running a cycle with no packages contained within the chamber 66. The alarm should not sound at the end of the empty cycle. When complete, one half of the original packages are placed within the chamber 66 and the cycle is run again. If the alarm does not go off, that subdivision contains no defective packages. The other half is then loaded and the above process is repeated until the leaking package or packages are found.

EXAMPLE

The photoionizer leak detector apparatus 20 was tested to determine its consistency in detecting small pin holes in isopropyl alcohol containing packages. Twenty packages were prepared by sealing a cleaning wire with a diameter of 0.002 inches in the top seal. After the seal cooled, the wire was removed leaving a hole through the seal of 0.002 inches. Each sample was individually tested for leaks and the detector reading recorded. Empty runs were performed between samples. The leak test cycle used was:

1. vacuum to 10 inches mercury;
2. hold at vacuum for 30 seconds;
3. vent chamber to atmospheric pressure;
4. test chamber air for alcohol for one minute; and
5. alarm limit set to 0.3 ppm.

The results are reflected in Table 1.

TABLE 1

| Sample # | Detector Response (ppm) | Sample # | Detector Response (ppm) |
|---|---|---|---|
| 1. | 1.1 | 11. | 1.6 |
| 2. | 1.3 | 12. | 0.6 |
| 3. | 1.5 | 13. | 0.6 |
| 4. | 1.3 | 14. | 1.3 |
| 5. | 1.2 | 15. | 0.7 |
| 6. | 1.0 | 16. | 1.0 |
| 7. | 1.2 | 17. | 1.4 |
| 8. | 1.2 | 18. | 1.2 |
| 9. | 1.5 | 19. | 1.1 |
| 10. | 1.2 | 20. | 1.2 |

The results indicate that the leak detector 20 will consistently detect a pinhole with a diameter of at least 0.002 inches in a single package when tested under these conditions.

The examples and embodiments depicted in this specification are not intended to be limitations on the inventive concept described herein. For example, all pressures and time limits described above may be varied by one with ordinary skill in the art and tailored to suit a particular application. The circuits and valves may be varied from pneumatic to electrical or combinations of the two or any other system which can be engineered to achieve the invention herein. Likewise, any ionizable chemical that can be detected by a photoionizer or gas chromatograph is appropriate for use herein, e.g., ethyl alcohol, methylene chloride, etc. Indeed, other devices and methods capable of detecting hydrocarbons are suitable for use according to the present invention, e.g., a flame ionizer, electron capture, thermal conductivity, etc. Accordingly, one with skill in the art may make modifications in the apparatus and method which are intended to be covered by the following claims.

What is claimed is:

1. A method for evaluating integrity of a sealed package comprising:
   depositing a volatile hydrocarbonaceous substance within a package:
   sealing the package:
   placing the package in a sealable chamber;
   sealing said chamber;
   pulling a vacuum in said chamber after said chamber has been sealed:
   maintaining the vacuum in said chamber for a predetermined time period and then allowing gas into said chamber to relieve the vacuum;
   sealing said chamber after the vacuum has been relieved; and
   monitoring said chamber for the presence of said volatile hydrocarbonaceous substance.

2. A method according to claim 1 further comprising exposing a hydrocarbon detector to at least a portion of the contents of said chamber after said chamber has been sealed and the vacuum relieved.

3. A method according to claim 2 further comprising purging said chamber after said hydrocarbon detector has been exposed to at least a portion of the contents of the chamber.

4. A method according to claim 2 further comprising purging said hydrocarbon detector after said hydrocarbon detector has been exposed to at least a portion of the contents of said chamber.

5. A method according to claim 2 wherein said hydrocarbon detector is a photoionizer.

6. A method according to claim 5 wherein said photoionizer is adapted to activate an alarm when the concentration of volatile hydrocarbonaceous substance exceeds a predefined limit.

7. A method according to claim 6 wherein said predefined limit is about 500 parts per million.

8. A method according to claim 2 wherein said hydrocarbon detector is a gas chromatograph.

9. A method according to claim 8 wherein said gas chromatograph is adapted to activate an alarm when the concentration of volatile hydrocarbonaceous substance exceeds a predefined limit.

10. A method according to claim 9 wherein said predefined limit is about 500 parts per billion.

11. A method according to claim 1 wherein the vacuum is at least about one inch of mercury.

12. A method according to claim 1 wherein the vacuum is from about five to about twenty inches of mercury.

13. A method according to claim 1 wherein the vacuum is maintained for about twenty-five to about thirty-five seconds.

14. A method according to claim 1 wherein said volatile hydrocarbonaceous substance is an organic solvent.

15. A method according to claim 1 wherein said volatile hydrocarbonaceous substance is isopropyl alcohol.

16. A method according to claim 1 wherein an alarm is adapted to be activated when the amount of volatile hydrocarbonaceous substance being monitored exceeds a predefined limit.

17. A method according to claim 1 wherein the sealed package contains surgical sutures.

18. An apparatus for evaluating the integrity of a sealed package which comprises:
   (i) a plurality of sealable chambers;
   (ii) a vacuum generator pump;
   (iii) a hydrocarbon detector; and
   (iv) means for selectively delivering gas from any one of said sealable chambers to said hydrocarbon detector.

19. An apparatus according to claim 18 wherein said hydrocarbon detector is a photoionizer.

20. An apparatus according to claim 19 further comprising alarm means adapted to be activated when the concentration of hydrocarbon exceeds a predetermined level.

21. An apparatus according to claim 20 wherein said predetermined level is 500 ppm.

22. An apparatus according to claim 18 wherein said hydrocarbon detector is a gas chromatograph.

23. An apparatus according to claim 22 further comprising alarm means adapted to be activated when the concentration of hydrocarbon exceeds a predetermined level.

24. An apparatus according to claim 23 wherein said predetermined level is 500 ppb.

25. An apparatus according to claim 18 wherein said hydrocarbon detector is adapted to measure an organic solvent.

26. An apparatus according to claim 18 wherein said hydrocarbon detector is adapted to measure isopropyl alcohol.

27. An apparatus according to claim 18 further comprising alarm means adapted to be activated when the concentration of hydrocarbon exceeds a predetermined level.

28. An apparatus according to claim 18 wherein said means for selectively delivering gas is a microprocessor controlled by program means.

29. An apparatus for evaluating the integrity of a sealed package which comprises:
   (i) a sealable chamber;
   (ii) a vacuum generator pump;
   (iii) a gas chromatograph; and
   (iv) conduit means for delivering air from said chamber to said gas chromatograph.

30. An apparatus according to claim 29 wherein said gas chromatograph is adapted to measure a volatile hydrocarbonaceous substance.

31. An apparatus according to claim 30 wherein said volatile hydrocarbonaceous substance is isopropyl alcohol.

32. An apparatus according to claim 29 further comprising alarm means adapted to be activated when the concentration of a volatile hydrocarbonaceous substance exceeds a predetermined level.

33. An apparatus according to claim 32 wherein said predetermined level is 500 ppb.

* * * * *